United States Patent [19]
Suenaga et al.

[11] Patent Number: 5,557,753
[45] Date of Patent: Sep. 17, 1996

[54] INFORMATION PROCESSING UNIT HAVING A MULTIPLEXED BUS AND A BUS CONTROL METHOD THEREFOR

[75] Inventors: Masashi Suenaga; Nobuo Tomita; Hiroshi Watanabe; Masayuki Tanji, all of Hitachi, Japan

[73] Assignee: Hitachi, Ltd., Tokyo, Japan

[21] Appl. No.: 943,001

[22] Filed: Mar. 10, 1992

[30] Foreign Application Priority Data

Sep. 12, 1991 [JP] Japan .................................. 3-232955

[51] Int. Cl.⁶ ...................................................... G06F 13/14
[52] U.S. Cl. ........................ 395/287; 395/181; 395/299; 364/DIG. 1; 364/230; 364/230.1; 364/240; 364/242.6; 364/242.7
[58] Field of Search ................................. 395/325, 725, 395/575, 287, 292, 299, 301, 308, 860, 181; 371/8.2, 9.1

[56] References Cited

U.S. PATENT DOCUMENTS

| | | | |
|---|---|---|---|
| 3,958,228 | 5/1976 | Coombes et al. ........................ | 395/575 |
| 4,486,826 | 12/1984 | Wolff et al. ............................... | 371/67 |
| 4,663,756 | 5/1987 | Retterath .................................... | 370/85 |
| 4,953,081 | 8/1990 | Feal et al. ................................. | 395/325 |
| 4,964,034 | 10/1990 | Jaskowiak ................................. | 395/325 |
| 4,977,557 | 12/1990 | Phung et al. ............................. | 370/85.6 |
| 5,016,162 | 5/1991 | Epstein et al. ............................ | 395/325 |
| 5,086,499 | 2/1992 | Mutone ..................................... | 371/8.1 |
| 5,151,994 | 9/1992 | Wille et al. ............................... | 395/325 |
| 5,153,874 | 10/1992 | Kohno ....................................... | 371/8.2 |
| 5,163,052 | 11/1992 | Evans et al. .............................. | 371/9.1 |
| 5,168,570 | 12/1992 | Eckert et al. ............................. | 395/725 |
| 5,210,756 | 5/1993 | Kummer et al. ......................... | 371/8.2 |
| 5,265,223 | 11/1993 | Brockmann et al. ..................... | 395/325 |
| 5,295,258 | 3/1994 | Jewett et al. ............................. | 395/575 |
| 5,345,566 | 9/1994 | Tanji et al. ............................... | 395/325 |

*Primary Examiner*—Ayaz R. Sheikh
*Attorney, Agent, or Firm*—Antonelli, Terry, Stout & Kraus

[57] ABSTRACT

A high-speed information processing in the information processing unit having a multiplexed bus is provided. A unit having a bus grant is stored in the next lowest priority unit memory circuits, and in the next bus arbitration cycle, bus arbitration is carried out by setting the lowest priority to the unit stored in the next lowest priority unit memory circuits. When a fault occurs in one of a plurality of buses and then the faulty bus recovered a normal operation status, the bus status supervising circuits output has fault recovery detecting signals and match the memory contents of the next lowest priority unit memory circuits together. With the above arrangement, an average bus waiting time can be minimized and the bus waiting time can be limited.

6 Claims, 8 Drawing Sheets

FIG. 3

| EVENT | BUS STATUS | BUS PRIORITY LOW → HIGH | | BUS REQUEST 51 | BUS REQUEST 53 | BUS REQUEST 55 | BUS GRANT |
|---|---|---|---|---|---|---|---|
| POWER-ON | INITIALIZE | NOT DECIDED | | NO | NO | NO | NO |
| SYSTEM MANAGEMENT PROCESSOR COMPLETED INITIALIZATION | NORMAL OPERATION | 51,52,53 | ....59 | NO | NO | NO | NO |
| PROCESSORS 51, 53 AND 55 OUTPUT BUS REQUESTS | | 51,52,53 | ....59 | YES | YES | YES | 55 |
| PROCESSOR 55 USES BUS AND PROCESSOR OUTPUTS BUS REQUEST AGAIN | | 55,56...59, 51,52...54 | | YES | YES | YES | 53 |
| PROCESSOR 53 USES BUS | | 53,54......59,51,52 | | YES | NO | YES | 51 |
| PROCESSOR 51 USES BUS | | 51,52,53 | ....59 | NO | NO | YES | 55 |
| PROCESSOR 55 USES BUS | | 55,56...59,51,52...54 | | NO | NO | NO | --- |
| --- | | --- | | --- | --- | --- | --- |

FIG. 5

| PROCESSOR | TRANSFER DATA QUALITY | | BUS PRIORITY |
|---|---|---|---|
| 51 | 2 | ☐☐ | 1 (LOWEST) |
| 52 | 1 | ☐ | 2 |
| 53 | 10 | ☐☐☐☐☐☐☐☐☐☐ | 3 |
| 54 | 5 | ☐☐☐☐☐ | 4 (HIGHEST) |

BUS UTILIZATION STATUS

| 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|
| 54 | 54 | 54 | 54 | 54 | 53 | 53 | 53 | 53 | 53 | 53 | 53 | 53 | 53 | 53 | 52 | 51 | 51 |

⟶ TIME

| PROCESSOR | BUS WAITING TIME |
|---|---|
| 51 | 16 |
| 52 | 15 |
| 53 | 5 |
| 54 | 0 |
| AVERAGE | 9 |

FIG. 6

| PROCESSOR | TRANSFER DATA QUANTITY | |
|---|---|---|
| 51 | 2 | ▢▢ |
| 52 | 1 | ▢ |
| 53 | 10 | ▢▢▢▢▢▢▢▢▢▢ |
| 54 | 5 | ▢▢▢▢▢ |

BUS UTILIZATION STATUS

| 54 | 53 | 52 | 51 | 54 | 53 | 51 | 54 | 53 | 54 | 53 | 54 | 53 | 53 | 53 | 53 | 53 | 53 |
|---|---|---|---|---|---|---|---|---|---|---|---|---|---|---|---|---|---|

| PROCESSOR | BUS WAITING TIME |
|---|---|
| 51 | 5 |
| 52 | 2 |
| 53 | 8 |
| 54 | 7 |
| AVERAGE | 6 |

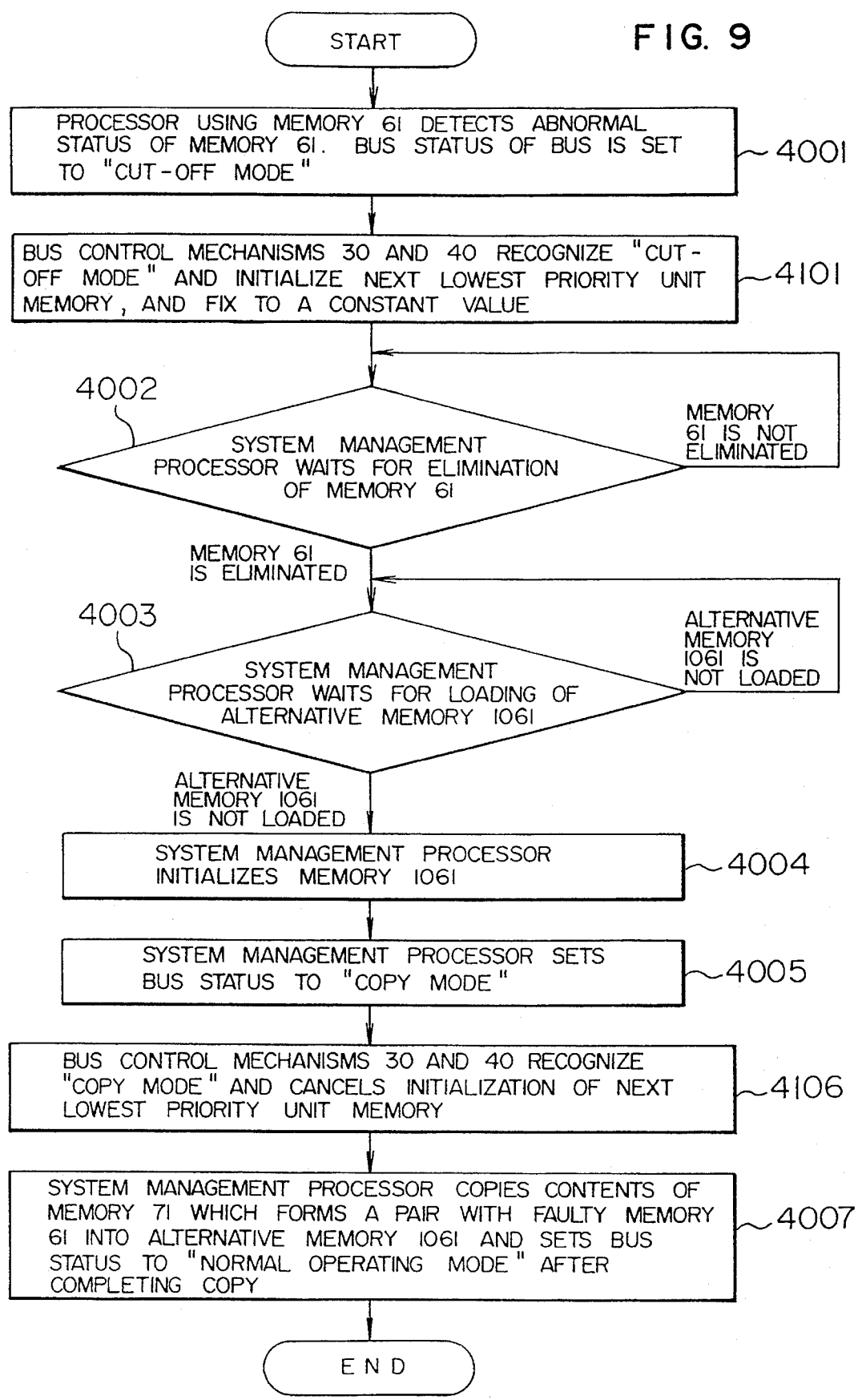

INFORMATION PROCESSING UNIT HAVING A MULTIPLEXED BUS AND A BUS CONTROL METHOD THEREFOR

BACKGROUND OF THE INVENTION

The present invention relates to an information processing unit and a bus control method therefor, and more particularly, to an information processing unit having a multiplexed bus and a bus control method therefor.

As a method for improving reliability of an information processing unit, each of the constituent elements of the information processing unit can be multiplexed and a bus for mutually connecting each of the constituent elements can also be multiplexed. A prior-art technique relating to bus multiplexing is described, for example, in the U.S. Pat. No. 4,486,826.

According to this previous patent publication, when sharing a bus with a plurality of processors and a plurality of input/output controllers for directly carrying out memory accesses (a device for exchanging signals with processors, input/output control mechanisms and other buses is hereinafter to be referred to as a "unit"), and when a plurality of units have when bus requests at the same time, priorities of these units must be determined. This system employs fixed priority bus arbitration, according to which bus a grant of a unit of the highest priority is given, and this system is characterized by its extremely simple control method.

The fixed priority bus arbitration system, however, has a problem in that when bus requests from a plurality of units become congested, the average bus waiting time increases with a result that a practical bus transfer rate is lowered for each unit which uses the bus. Further, this bus arbitration system is not suitable for systems such as a real-time processing system and an on-line transaction processing system which require that processing of a specific process should be completed within a predetermined time.

SUMMARY OF THE INVENTION

It is a first object of the present invention to provide an information processing unit having a multiplexed bus which can easily improve the practical transfer capacity for of each unit that utilizes the bus.

In an information processing unit having a multiplexed bus, it is a second object of the present invention to provide a bus arbitration system which provides fair priority to each of a plurality of units connected to the bus and which enables reliable and efficient predicting of a bus waiting time.

In order to achieve the above objects, the information processing unit according to the present invention includes a plurality of units, a plurality of buses shared by the plurality of units, for carrying out bus transfer of data either by a plurality of buses or by a single bus and a device connected to each of the plurality of buses, for performing a bus arbitration cycle which provides a bus grant to only one unit in response to bus requests made from the plurality of units to individual buses. Thus, a bus grant is given to only one selected unit among a plurality of units, each selected unit being different for each bus arbitration cycle.

In other words, bus arbitration is carried out based on a standard which averages the probability that each unit of the plurality of units gains access to the bus.

Further, according to the present invention, the bus control mechanism, which is connected to each of the plurality of buses constituting the multiplexed bus, selects one unit against bus requests which are made from the plurality of units connected to the buses, and gives a bus grant to this selected bus to thereby perform bus arbitration, and the bus control mechanism has the next lowest priority unit memory for storing a unit to which the last bus grant was given. By giving the lowest priority to the unit being stored in the next lowest priority unit memory, priorities of the units other than the unit stored in the next lowest priority unit are sequentially increased to thereby further perform bus arbitration.

Further, according to the present invention, the bus control mechanism has a bus status supervisor for monitoring the presence or absence of a fault in a bus. When the bus status supervisor has detected that a bus has recovered to normal status after a fault has occurred in the bus, a bus fault recovery signal is produced, and then the memory contents of the next lowest priority unit memory are matched with the memory contents of the next lowest priority unit memories provided in the bus control mechanisms of the other buses constituting the multiplexed bus.

Further, according to the present invention, when the bus status supervisor provided in the bus control mechanism has detected that a bus has recovered to normal operating status after a fault has occurred in the bus, a bus fault recovery signal is produced, and then the memory contents of the next lowest priority unit memory are initialized to a constant value so that the memory contents are matched with the memory contents of the next lowest priority unit memories provided in other bus control mechanisms constituting the multiplexed bus. The above-described characteristics and other characteristics of the present invention will be made more clear by the following description.

In the information processing unit having a multiplexed bus for a plurality of units, a bus grant is given to one unit among a plurality of units, a selected unit being different for each bus arbitration cycle, so that optimum operation can be achieved according to the status of the multiplexed bus.

The operation of the information processing unit according to the present invention will be explained below with reference to an embodiment of the present invention.

When a plurality of units have simultaneously output bus requests to the bus control mechanism, a bus grant is first given to the unit having the highest priority and then afterward the priority of this unit is stored as the lowest priority in the next lowest priority unit memory. Next, a bus grant is given to a unit which had the next highest priority after the unit of the highest priority in the previous bus arbitration cycle. The above process is repeated thereafter so that a bus grant is given to all the units which have output bus requests.

When a fault occurs in one of the buses constituting the multiplexed bus, the bus in which the fault has occurred is separated and no data is transferred to this bus. Thus, the next lowest priority unit memory within the bus control mechanism connected to the bus having experience the fault occurrence is not updated, and therefore the memory contents of this next lowest priority unit memory may not coincide with the memory contents of the next lowest priority unit memories provided in the bus control mechanisms of the other buses which constitute the multiplexed bus.

Then, when the cause of the fault is eliminated from the bus in which the fault occurred and the bus has recovered to the normal operating status, the bus status supervisor provided in the bus control mechanism connected to everyone of the buses constituting the multiplexed bus detects the fault recovery having experienced the bus of the fault occurrence, outputs the detection to the next lowest priority unit memory so that the memory contents of this next lowest priority unit memory are matched with the memory contents of the next lowest priority unit memories provided within the bus control mechanisms of the other buses constituting the multiplexed bus. With the above arrangement, when a fault has occurred in one of the buses constituting the multiplexed bus and then the bus has recovered from the fault, the memory contents of the next lowest priority unit memory within the bus control mechanism of the bus in which the fault occurred can be coincided with the memory contents of the next lowest priority unit memories within the bus control mechanisms of the other buses which constitute the multiplexed bus, so that the bus having experienced the fault occurrence can be arbitrated in the same manner as the other buses.

In matching the memory contents of the next lowest priority unit memories provided in the bus control mechanisms of all the buses when a bus in one of the buses constituting a multiplexed bus is to recover from a fault, a fault recovery detecting signal is generated by the bus status supervisor provided in each bus control mechanism, so that the next lowest priority unit memory is initialized to a constant value. This initialization is carried out all together in the bus control mechanisms of all of the buses that constitute the multiplexed bus. Accordingly, the memory contents of the next lowest priority unit memories within the bus control mechanisms for all the buses coincide with each other.

BRIEF DESCRIPTION OF THE DRAWINGS

FIG. 3 is a diagram for showing the flow of the build-up after power-on and normal operation according to one embodiment of the present invention;

FIG. 5 is a diagram showing one example of a bus usage status at one point of time according to the fixed priority system;

FIG. 6 is a diagram for showing a bus utilization status at one point of time according to one embodiment of the present invention;

FIG. 9 is a flow chart for showing the bus control when a bus fault occurs according to another embodiment of the present invention.

DESCRIPTION OF THE PREFERRED EMBODIMENTS

One embodiment of the present invention will be explained with reference to FIGS. 1 to 8.

Figure 2:
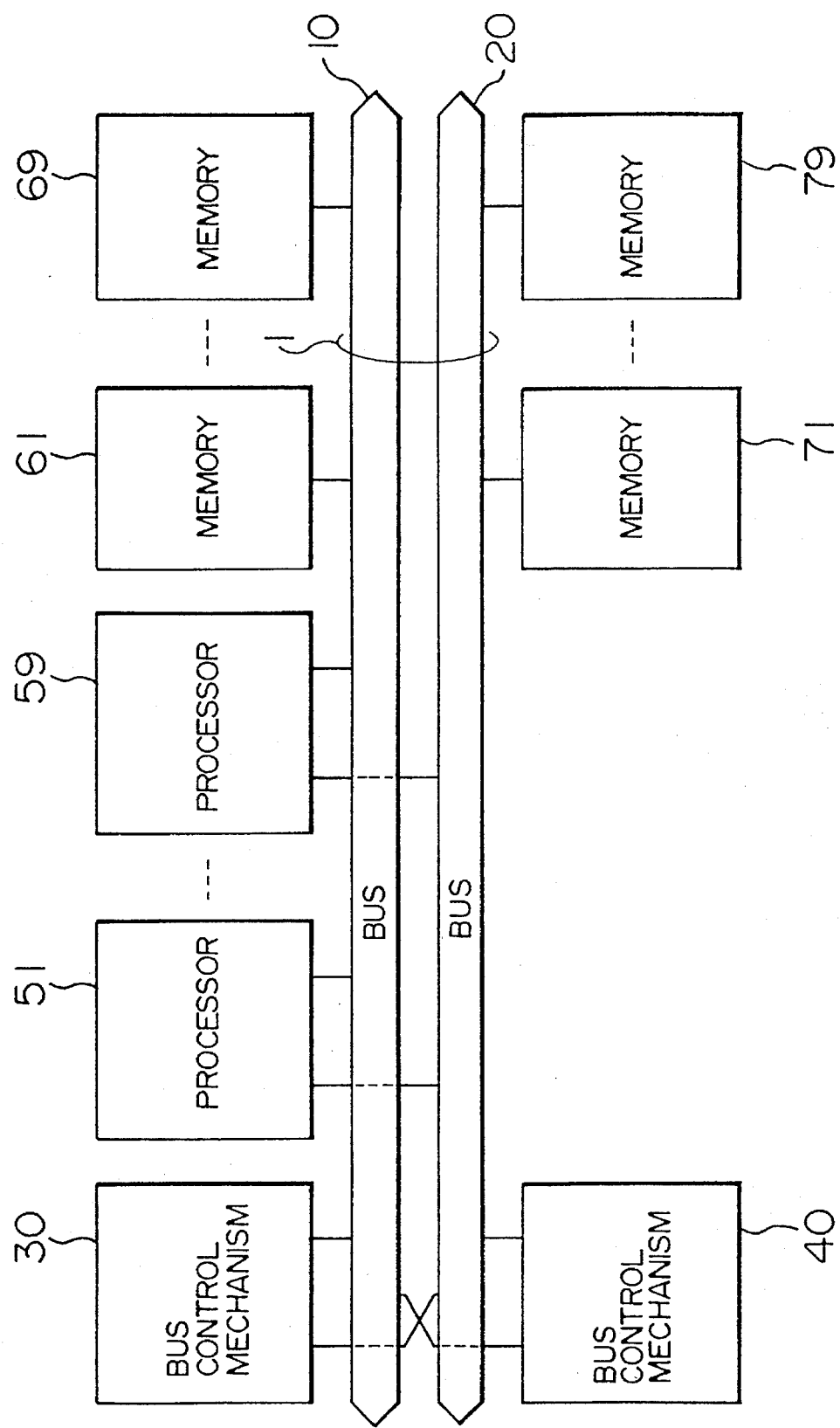
FIG. 2 is a schematic configuration diagram of the information processing unit according to one embodiment of the present invention.

FIG. 2 is an overall schematic configuration diagram for showing the information processing unit according to one embodiment of the present invention. The present information processing unit is designed for use in an area which requires high reliability, and can continue to operate normally even if one of the constituent elements within the information processing unit has a fault.

Figure 8:
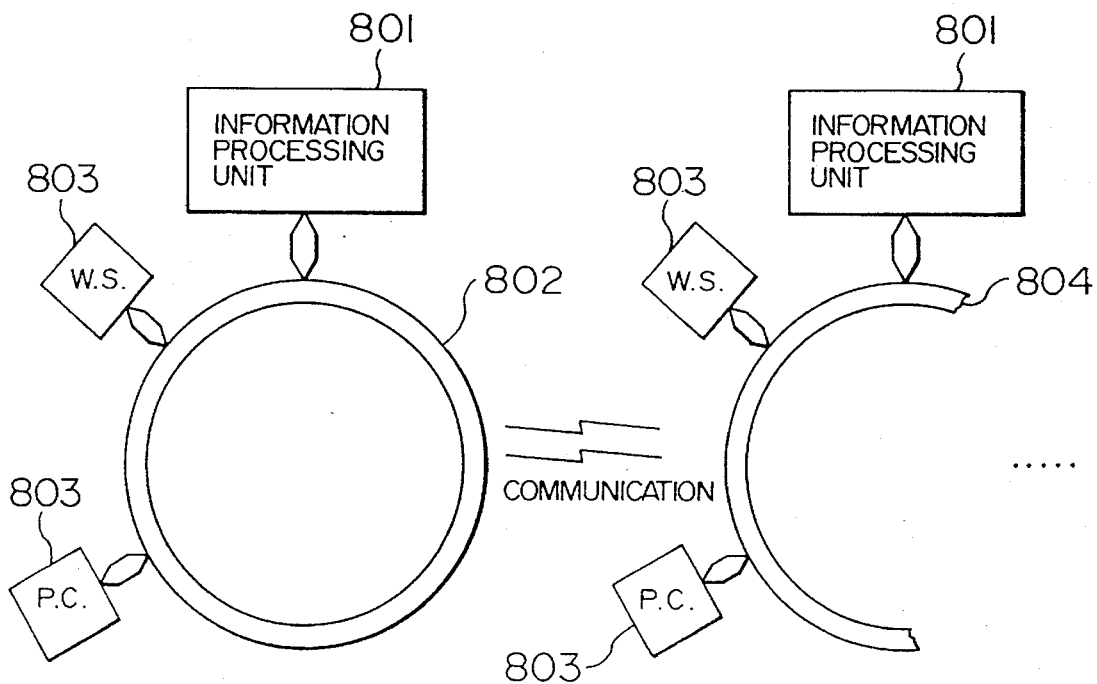
FIG. 8 is an overall schematic diagram of the information processing system according to one embodiment of the present invention.

An information processing unit of FIG. 2 is shown as constitutes 801 in FIG. 8 and is connected to a work station or a personal computer which is a terminal unit 803 in a network 802, to structure an information processing system which can operate continuously to meet a required high level of reliability. The network 802 can communicate with an external network such as a second network 804 having the similar structure, and carry out information processing.

Referring to FIG. 2, bus 1 is a duplexed bus structured by two buses 10 and 20 having the same specification. The bus 1 is connected to a plurality of processors 51 to 59, memories 61 to 69 and memories 71 to 79. The processors 51 to 59 include a basic processor for executing instructions of a software program, a file control processor for controlling auxiliary storage units such as magnetic disk units and magnetic tape units, a communication control processor for controlling communications, a network control processor for controlling a network, and an input/output control processor for controlling interactive terminals and printers. The processors 51 to 59 are connected to the bus 10 and the bus 20 so that they can continue normal operation even if a fault has occurred in either one of bus 10 and the bus 20. The memories 61 to 69 are connected to the bus 10 and the memories 71 to 79 are connected to the bus 20, whereby the two memory groups form pairs such as the memory 61 and the memory 71 forming one pair and the memory 62 and the memory 72 forming another pair, respectively. The same data are stored in both memories of each pair. With this arrangement, even if one of the memories forming a pair suffers a fault or even if one of the buses 10 and 20 suffers a fault, the information processing unit can utilize the data stored in one of the memories so as to be able to continue normal operation. For example, when the memory 61 suffers a fault, the processors 51 to 59 can utilize the data stored in the memory 71 through the bus 20 so as to continue processing, because the data stored in the memory 71 is the same as the data stored in the memory 61. When the bus 20 suffers a fault, for example, the data stored in the memories 71 to 79 cannot be utilized, but since the data stored in the memories 61 to 69 connected to the bus 10 corresponds to the data stored in the memories 71 to 79, the processors 51 to 59 can utilize the data stored in the memories 61 to 69 through the bus 10 so as to be able to continue normal operation.

In the present embodiment, bus arbitration is carried out by the bus control mechanism and each bus has one bus control mechanism, that is, bus 10 has a bus control mechanism 30 and bus 20 has a bus control mechanism 40. Since both bus control mechanisms operate independently, the information processing unit can continue normal operation even if one of the bus control mechanisms suffers a fault.

According to the present invention, since it is necessary to store the same data in the memories connected to the two buses respectively, it is necessary to transfer the same data by always utilizing the two buses. Further, in order to match the data stored in the memories connected to the two buses respectively, a bus grant is given to the same unit in the same bus arbitration cycle of the two buses. Accordingly, both bus control mechanisms 30 and 40 give a bus grant to the same unit in the same bus arbitration cycle, except when one of the buses is separated.

Figure 1:
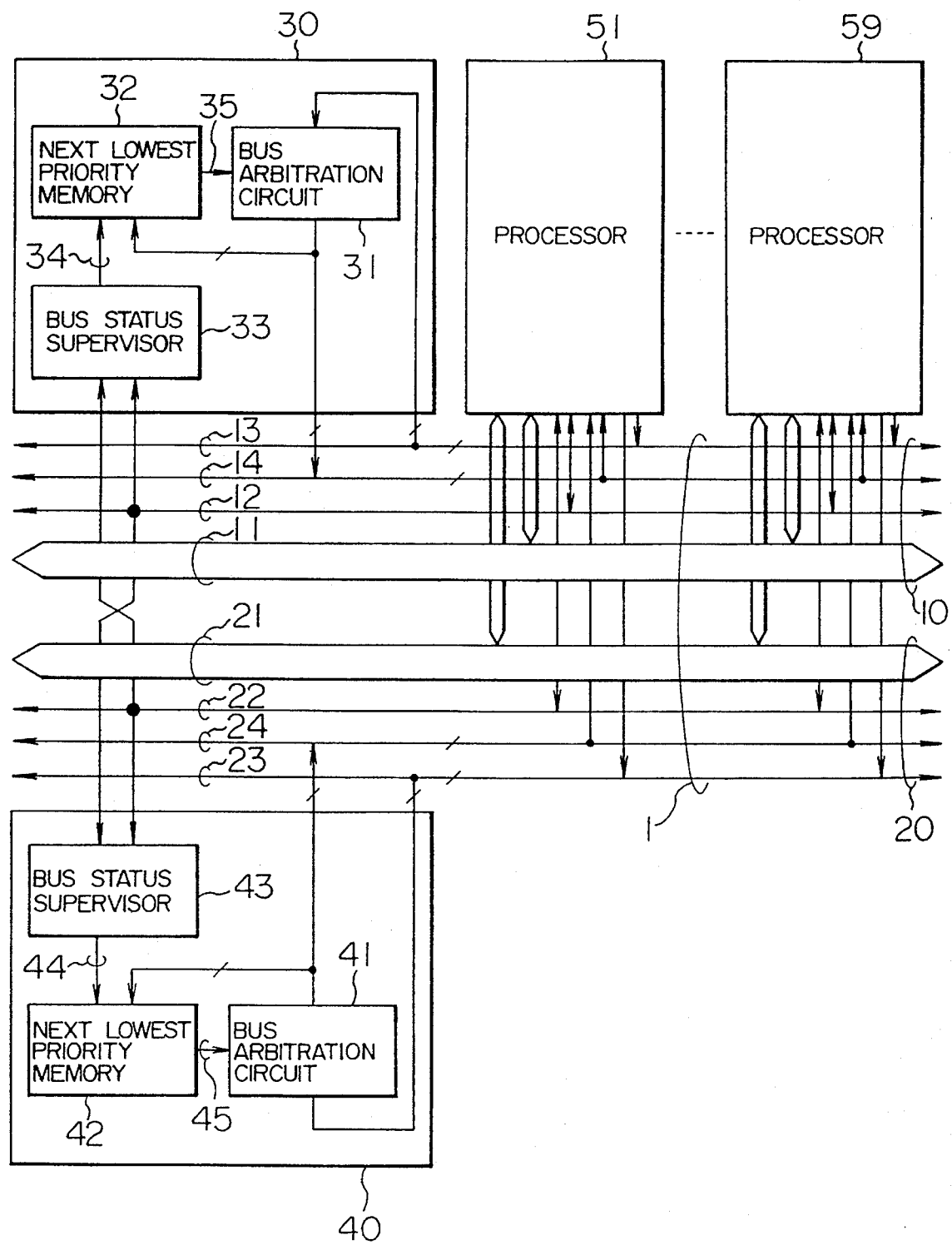
FIG. 1 is a block diagram showing one embodiment of the present invention.

FIG. 1 is an explanatory diagram for showing the details of a part of FIG. 2.

The bus 10 consists of a bus body 11 to be used for bus transfer, a bus status 12 for showing presence or absence of a fault in the bus 10, a bus request 13 from each unit connected to the bus body 11, and a bus grant 14 to be output from the bus control mechanism 30 corresponding to the bus request. Similarly, bus 20 consists of a bus body 21, a bus status 22, a bus request 23 and a bus grant 24.

The bus control mechanism 30 consists of a bus arbitration circuit 31 for carrying out bus arbitration, a next lowest priority unit memory 32 (shown as a "next lowest priority memory" in FIG. 2) for storing a slot number of the slot loading the unit to which a bus grant has been given as a result of bus arbitration, and a bus status supervisor 33 (shown as a "bus status supervisor" is FIG. 2) for monitoring the presence or absence of a fault in both of the buses 10 and 20, and outputting a bus fault recovery signal 34 when a bus having experienced a fault occurrence has recovered normal operation after the cause of the bus fault has been removed. Similarly, the bus control mechanism 40 connected to the bus 20 consists of a bus arbitration circuit 41, a next lowest priority unit memory 42 (shown as a "next lowest priority memory" in FIG. 2), and a bus status supervisor 43 (shown as a "bus status supervisor" in FIG. 2) for outputting a bus fault recovery signal 44 when a bus having experienced a fault in either bus 10 or bus 20 has recovered normal operation.

The operation sequence of the information processing unit according to the present invention when the unit has been initialized after the power source was turned on and when both of the buses 10 and 20 are operating normally, will be explained with reference to FIG. 3.

In the information processing unit according to the present embodiment, the processors 51 to 59 are loaded to slot numbers 1 to 9. When the system is in the "initialized state" after the power source is turned on, the bus status 12 and the bus status 22 of the buses 10 and 20 respectively show the initial mode. Of the processors 51 to 59, one system management processor initializes the system and then sets the bus status 12 and the bus status 22 of the respective buses 10 and 20 to the "normal operation mode". With the above arrangement, the bus status supervisor 33 and the bus status supervisor 43 within the bus control mechanisms 30 and 40 respectively set the next lowest priority unit memories 32 and 42 to "1" respectively. Thus, in the bus arbitration circuits 31 and 41, the priority of the processor 51 loaded to the slot number "1" is set to be the lowest. Then, the priorities of the subsequent processors are set higher in the order of the processor 52, the processor 53 and so on, with the highest priority set to the processor 59. When the processors 51, 53 and 55 have output bus requests at the same time in this state, the bus arbitration circuits 31 and 41 give a bus grant to the processor 55 which has the highest priority, so that the processor 55 can use the bus. The bus arbitration circuits 31 and 41 store the slot number "5" of the processor 55 in the next lowest priority unit memories 32 and 42 respectively. Thus, in both bus arbitration circuits 31 and 41, the processor 55 has the lowest priority, and priorities are higher in the order of the processors 56, 57 and so on, with the highest priority set to the processor 54. While the processor 55 is transferring unit data, a bus arbitration cycle for determining a bus grant in the next bus transfer cycle is executed. Suppose there is no bus request from other than the processors 51 and 52 both of which output bus requests but did not obtain a bus grant last time, since the processor 53 has the highest bus priority in this bus arbitration cycle, a bus grant is given to the processor 53. In this case, even if the processor 55 output a bus request for the next data transfer, no bus grant is given to the processor 55 for the next bus transfer cycle because the bus priority of the processor 55 is the lowest in this case. In the next bus cycle, the slot number "3" of the processor 53 is stored in the next lowest priority unit memories 32 and 42 respectively so that the processor 53 has the lowest priority in this case. The priorities are high in the order of the processors 54, 55 and so on, with the highest priority set to the processor 52. If the processors 51 and 55 output a bus request this time which could not obtain a bus grant in the preceding bus arbitration cycle, the processor 51 can obtain the bus grant in the next bus cycle because the processor 51 has higher priority than the processor 55. The bus priorities are rotated in the same manner so that a processor which output a bus request can surely obtain a bus grant once during one cycle.

The operation sequence from when a fault occurred in one of the buses 10 and 20 until when the faulty bus can recover a normal operation will be explained with reference to FIG. 4.

As an example, assume that bus 10 cannot be used because a short circuit has occurred in the wiring of a bus connecting circuit of the memory 61 which is connected to bus 10. When the processor utilizing the bus has detected the abnormal status of bus 10 such as a bus parity error and a bus timeout error when the wiring of the bus connecting circuit of the memory 61 short circuited, the bus status 12 of the bus 20 is set to the "cut-off mode". When the bus status 12 is set to the "cut-off mode", the bus status supervisors within the bus control mechanisms 30 and 40 recognize that a fault has occurred in the bus 10 and continue to wait until the bus status 12 changes from the "cut-off mode".

In the mean time, of the processors 51 to 59, a processor selected by the system management processor (the processor 51, for example) similarly recognizes that a fault has occurred in the bus 10, and waits until an alternative unit is loaded to the bus 10 after the unit connected to the bus 10 is removed therefrom. When the faulty memory 61 has been removed from the bus 10 and an alternative memory 1061 has been loaded thereto, the system management processor 51 initializes to set the alternative memory 1061 to be operable and resets the bus status 12 from the "cut-off mode" to be "copy mode". The bus status 12 is set to the "copy mode" so that the data stored in the memories 71 to 79 are copied to the memories 62 to 69 and the alternative memory 1061 because no correct data have been stored in the memories 62 to 69 which were connected to the bus 10 while the bus 10 was in the "cut-off mode" and in the alternative memory 1061 which has been newly loaded. In the "copy mode", the system management processor 51 copies the data from the memories 71 to 79 to the alternative memory 1061 and the memories 62 to 69. When the bus status 12 of the bus 10 has changed to the "copy mode", the bus status supervisors 32 and 42 recognize that the bus 10 has recovered normal status and output bus fault recovery signals 34 and 44 respectively. With the above arrangement, the next lowest priority unit memories 33 and 44 initialize so that the processor 51 of the slot number 1 has the lowest priority, in the same manner as the one at the initialization time after the power source is turned on. Thereafter, the bus control mechanisms 30 and 40 continue normal operation.

The above-described operation may be partly changed. For example, when the bus status 12 of the bus 20 becomes the "copy mode", the bus status supervisors 32 and 42 recognize that the bus 10 has recovered normal status and output the bus fault recovery signals 34 and 44. In this case, instead of the next lowest priority unit memories 33 and 43 initializing so that the processor 51 of the slot number 1 has the lowest priority, in the same manner as the initialization time after turning on the power source, the memory content of the next lowest priority unit memory 33 may be set equal to the memory contents of the next lowest priority unit memory 43. Thereafter, the bus control mechanisms 30 and 40 continue normal operation.

Until the copying has been completed, there is no guarantee that the data stored in the alternative memory 1061 and the memories 62 to 69 match the data stored in the memories 71 to 79, and, therefore, the data stored in the alternative memory 1061 and the memories 62 to 69 are disregarded although the data is read. When the data is to be written, the data is written in all of memories 71 to 79, the alternative memory 1061 and the memories 62 to 69 to allow the rewriting of the memory contents of the memories 71 to 79 by the processors 51 to 59 during the copying of the memories. When the copying of the data to the alternative memory 1061 and the memories 62 to 69 has been completed, the system management processor 51 sets the bus status 12 of the bus 10 to "normal operation mode" and then continues normal operation.

Practical data transfer capacity for each unit utilizing the bus in the present embodiment will be explained with reference to FIGS. 5 and 6.

FIGS. 5 and 6 show the bus utilization status when the processors 51 to 54 simultaneously output data transfer requests at a certain time which is a bus transfer required time, in the case where bus arbitration is carried out based on the fixed priority, as shown in FIG. 5, and in the case where bus arbitration is carried out based on the present embodiment, as shown in FIG. 6, respectively.

In the case of the fixed priority, as shown in FIG. 5, the processor 53 with a large transfer data quantity has the higher bus priority than the processors 51 and 52 with a smaller transfer data quantity. Therefore, processor 53 occupies the bus after the processor 54 finishes data transfer, and the processors 51 and 52 cannot obtain the bus until after the processor 53 finishes the entire data transfer, resulting in an average bus waiting time increasing.

On the other hand, according to the present embodiment, processor 53 with a large transfer data quantity does not occupy the bus, so that the processors 51 and 52 with a smaller transfer data quantity can finish data transfer early, resulting in an average bus waiting time being reduced. Therefore, according to the present embodiment, the data transfer required time for each processor utilizing the bus can be reduced by the required reduction time for waiting for the bus, with an equal effect that the bus data transfer capacity is increased, as shown in FIG. 6.

Further, according to the present embodiment, even if a plurality of processors have simultaneously output bus requests, every processor is given one bus grant during one rotation of the bus priorities. Accordingly, bus waiting time per unit data transfer does not exceed a maximum number of units connected to the bus and is limited and is reliably and efficiently predictable. Thus, this system can be applied to a real-time processing having a time constraint.

Figure 7:
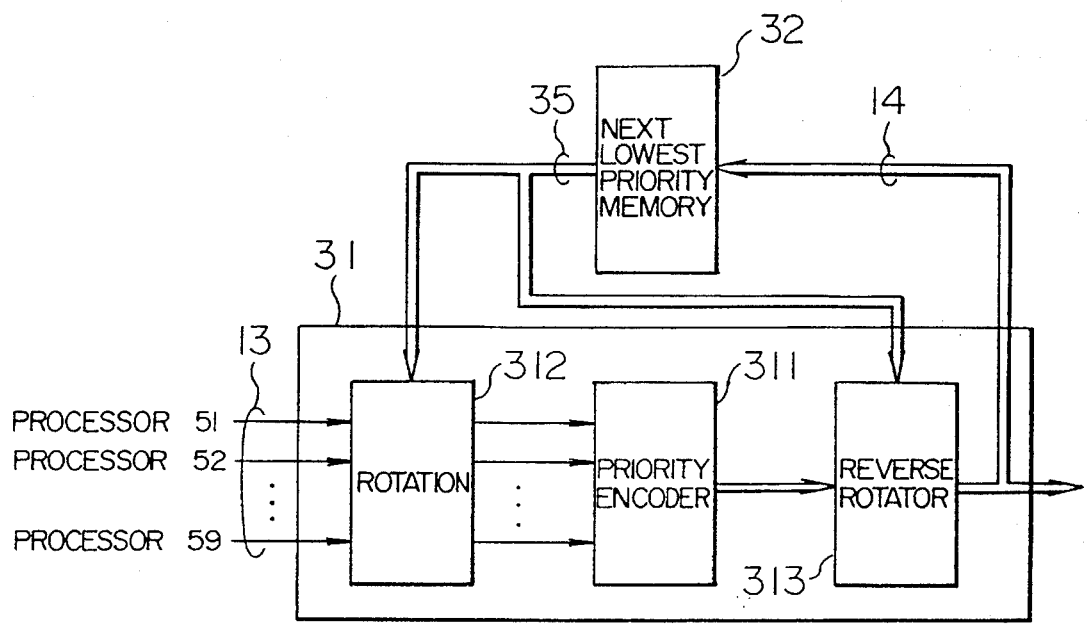
FIG. 7 is a block diagram of the bus arbitration circuit according to one embodiment of the present invention.

FIG. 7 shows a block diagram of the bus arbitration circuit 31 within the bus control mechanism 30 according to the present embodiment. The bus arbitration circuit 31 consists of a priority encoder 311, a rotator (shown as a "rotator" in FIG. 7) for generating an input of the priority encoder by rotating the bus request 13 from the processors 51 to 59 in accordance with a slot number 35 of the next lowest priority unit stored in the next lowest priority unit memory (shown as a "next lowest priority memory" in FIG. 7) 32, and a reverse rotator for reverse rotating the output of the priority encoder 311 by the number of rotation made by the rotator 312 according to the slot number 35 of the next lowest priority unit.

The rotator 312 and the reverse rotator 313 constituting the bus arbitration circuit 31, the next lowest priority unit memory 32 and the bus status supervisor 33 according to the present embodiment can be structured based on the combination logic, except for the next lowest priority unit memory 32. The use of a high-speed device used for improving the transfer capacity of the bus itself is not essential, although it is desirable to use a high-speed device for each constituent circuit to improve the transfer capacity of the bus itself.

In the above embodiment, a duplexed bus has been explained as an example of the multiplexed bus, but the embodiment can also be applied to the system having a triplex bus or even more buses.

According to the present embodiment, there is no problem of the fixed priority system in which the unit of a higher priority continuously uses the bus and the other units of lower priority have to wait for their turn until the unit of the higher priority finishes the transfer of all of its data.

When the multiprocessor is structured by utilizing the bus of the bus arbitration system, the bus transfer required time is a sum of the actual time taken for the data transfer on the bus and the time required for waiting for the bus before the bus can be used for the data transfer. When the bus transfer waiting time is short, the practical transfer capacity of the bus improves, and when the bus transfer waiting time is long the practical transfer capacity of the bus is lowered. Since the bus transfer waiting time can be reduced according to the present embodiment, the practical transfer capacity of the bus can be improved.

When the bus utilization rate is high, in a conventional fixed priority system, a processor of lower bus priority takes a longer bus waiting time than the processor of the higher bus priority, so that the processing capacity of the processor of the lower bus priority is lowered and the performance of a plurality of processors connected to the bus does not become uniform. However, according to the present embodiment, when the bus utilization rate is high, performance of a plurality of processors can be made uniform and a higher priority can be placed to the work of the processor which takes a short CPU utilization time. Thus, an average allocated waiting time can be minimized. Accordingly, performance of the information processing unit can be improved with high reliability because it is not necessary to be conscious about which processor has a higher bus priority to achieve a greater time efficiency in allocating processors to processes having time constraints.

In other words, according to the present embodiment, an average bus waiting time is short in the multiplexed bus, and a bus waiting time per unit data of a plurality of processors connected to the bus is limited and is easily predictable so that the bus utilization rate of the plurality of processors can be made uniform.

Another embodiment of the present invention will be explained next.

In the above-described embodiment, the next lowest priority system (which is also referred to as a variable priority system) has been used as the bus arbitration system. On the other hand, the present embodiment is characterized in that the bus arbitration system can be changed over between the fixed priority system and the next lowest priority system.

To be more specific, during the normal operation, the next lowest priority system is employed as the bus arbitration system, and the fixed priority system is employed at the time when a fault occurs, and the next lowest priority system is employed again when the normal operation status has been recovered.

In order to achieve the above characteristics of the present embodiment, instead of outputting the fault recovery detecting signals 34 and 44 from the bus status supervisors 33 and 43 (shown as the "bus status supervisor" in FIG. 1) at the portions of the bus control mechanisms 30 and 40 in FIG. 1, priority fixing signals 1034 and 1044, which are kept from when the bus statuses 12 and 22 become the "cut-off mode" until the bus statuses 12 and 22 become the "copy mode", are output. During the period when the priority fixing signals 1034 and 1044 are in the on-status, the memory contents of the next lowest priority unit memories 32 and 42 are fixed to a constant value.

Figure 4:
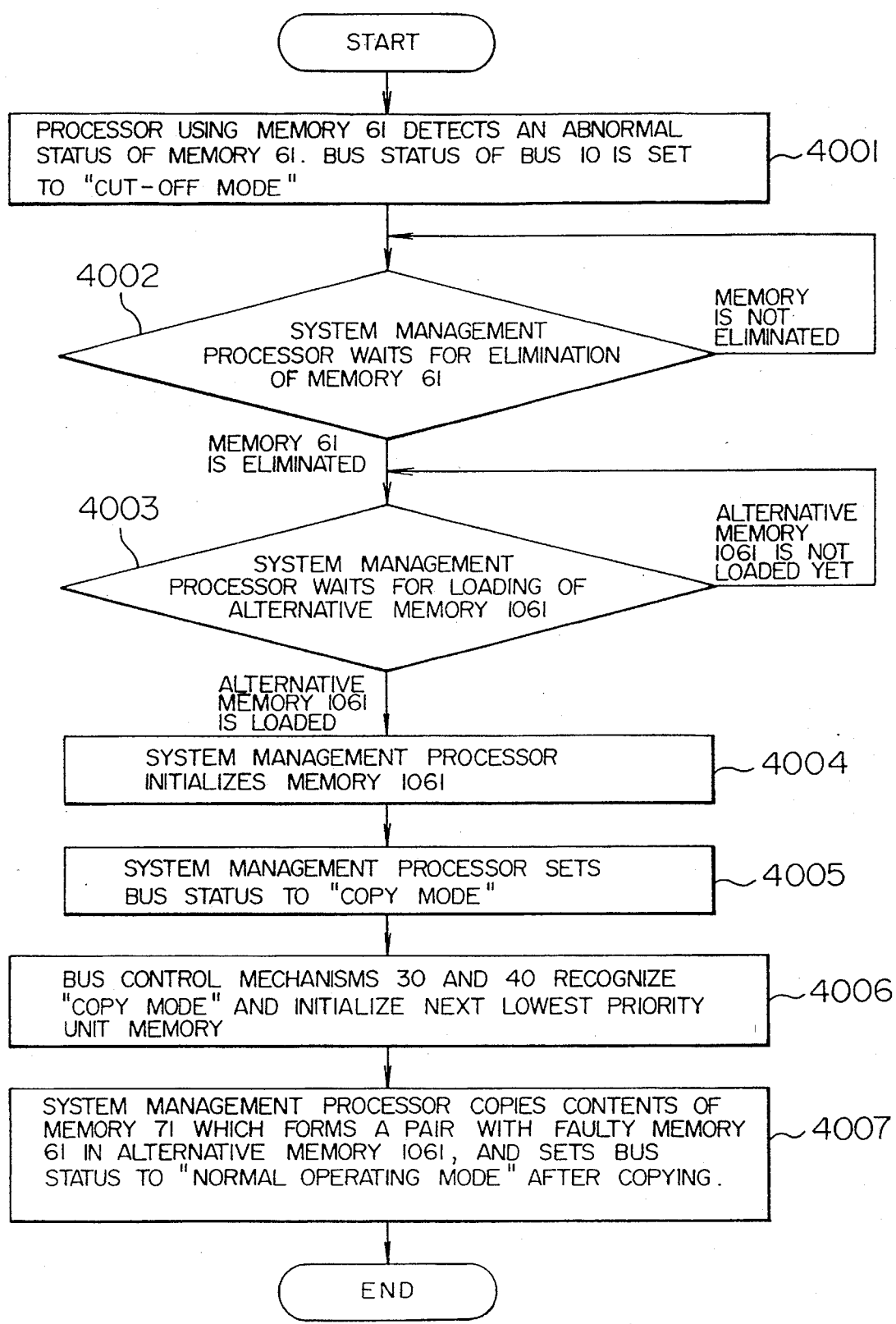
FIG. 4 is a flow chart for showing the bus control when a bus fault occurs according to one embodiment of the present invention.

Further, when the bus status 12 or 22 has become the "cut-off mode" as shown in FIG. 9 at the portions of 4001 and 4006 in the flowchart shown in FIG. 4, the fixing of the memory contents of the next lowest priority unit memories 32 and 42 of the bus control mechanisms 30 and 40 to the fixed value is canceled.

As an example of the method for fixing the memory contents of the next lowest priority unit memories 32 and 42 to a constant value, there is a method for initializing the memory contents of the next lowest priority unit memories 32 and 42 by the priority fixing signals 1034 and 1044. Since the memory contents of the next lowest priority unit memories 32 and 42 are kept in the initialized status when the priority fixing signals 1034 and 1044 are in the on-status, the memory contents maintain the constant value and a bus arbitration of the fixed priority system is carried out. When the bus statuses 12 and 22 become the "copy mode" and the priority fixing signals 1034 and 1044 are in the off-status, the initialization of the memory contents of the next lowest priority unit memories 32 and 42 is canceled, so that the bus arbitration of the next lowest priority system is restarted automatically.

According to the present embodiment, it is not necessary to match the memory contents of the next lowest priority unit memories during recovery from a fault. Further, when a has occurred in one of the systems, the control is simple because of the bus arbitration based on the fixed priority, and there is little risk of an occurrence of a fault in the operation of the rest of the systems, thus increasing the reliability of the systems.

As described above, according to the present invention, there are following effects. First, in the information processing unit having a multiplexed bus, practical transfer capacity for each unit utilizing the bus can be improved easily.

Second, in the information processing unit having a multiplexed bus, a bus waiting time is consistent for each of a plurality of units connected to the bus and the bus waiting time is reliably and efficiently predictable.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. An information processing unit, including;
   a plurality of units;
   a plurality of buses commonly shared by said plurality of units; and
   bus arbitration means corresponding independently to each one of said plurality of buses, including:
     means for determining whether bus requests are received from particular ones of said plurality of units, through one of said buses to which said bus arbitration means is connected,
     priority memory means for storing information indicating respective bus priority of said plurality of units,
     priority discriminating means for giving a bus grant to a particular one of said plurality of units having a highest priority among units transmitting a bus request and for writing information indicating updated bus priority into said priority memory means so that the particular unit to which the bus grant is given subsequently bears the lowest priority bus request among said plurality of units and information stored in said priority memory means,
     bus status supervising means, connected to each one of said plurality of buses, for supervising status of said plurality of buses, and generating a bus recovery signal indicating, to all of said plurality of units, when a fault occurring in one of said plurality of buses has been eliminated, and
     means, connected to said priority memory means and said bus status supervising means to receive said bus recovery signal, for matching the priority information stored in said priority memory means for storing updated priority information based on priority judgement by said priority discriminating means of said bus arbitration means of said bus having the fault occurred therein with said information stored in said priority memory means of said bus arbitration means of the remaining buses;
   wherein said bus arbitration means of respective ones of said plurality of buses selects a same particular unit for transferring identical data in a same bus cycle when no fault occurs in any of said plurality of buses, and when a fault does occur in a particular one of said plurality of buses the remaining buses alone are used for transferring the identical data.

2. An information processing unit according to claim 1, wherein an initialization is carried out by said bus recovery signal so that memory contents of said priority memory means of said bus having the fault eliminated therefrom are matched with the memory contents of said priority memory means provided in the bus arbitration means of the remaining buses.

3. An information processing unit, including;
   a plurality of units;
   a plurality of buses commonly shared by said plurality of units; and
   bus arbitration means independently connected to each one of said plurality of buses, including:
     means for determining whether bus requests are received from particular ones of said plurality of units, through one of said buses to which said bus arbitration means is connected,
     priority memory means for storing information indicating respective bus priority of said plurality of units,
     priority discriminating means for giving a bus grant to a particular one of said plurality of units having a highest priority among units transmitting a bus request and for writing information indicating updated bus priority into said priority memory means so that the particular unit to which the bus grant is given subsequently bears the lowest priority bus request among said plurality of units and information stored in said priority memory means, bus status supervising means connected to each one of said plurality of buses for supervising the status of said plurality of buses, having means for generating a bus status signal indicating the presence or absence of a fault in any one of said plurality of buses and for, when said bus status signal indicates that a fault has occurred in any one of said plurality of buses, indicating prohibition of updating bus priority into said priority memory means from said priority discriminating means of said bus arbitration means;

wherein said bus arbitration means of respective ones of said plurality of buses selects a same particular unit for transferring identical data in a same bus cycle when no fault occurs in any of said plurality of buses, and when a fault does occur in a particular one of said plurality of buses the remaining buses alone are used for transferring the identical data.

4. A bus controlling method for an information processing unit in which identical data is transferred by a plurality of buses having a same specification shared by a plurality of units capable of transferring data by using said plurality of buses, each of said plurality of buses including priority memory means for storing information indicating respective priority of said plurality of units, said method comprising the steps of:

storing information indicating respective bus priority of said plurality of units into said priority memory means so that the same unit includes the same priority in all of the plurality of buses;

assigning a bus grant to a particular one of said plurality of units having a highest priority according to said information stored in said priority memory means;

indicating, to said priority memory means, that said unit to which the bus grant is assigned subsequently has the lowest priority, so that the bus grant of said plurality of buses is assigned to a same particular unit for transferring the identical data in said plurality of buses;

assigning, when a fault occurs in a particular one of the plurality of buses, the bus grant to the one of said plurality of units having the highest priority according to said information stored in said priority memory means, excluding said bus having the fault occurred therein, and subsequently indicating to said priority memory means that said unit to which the bus grant has been assigned has the lowest priority, so that the bus grant is assigned to the same unit for transferring the identical data in said plurality of buses; and indicating, when the fault occurring in the particular one of said buses is eliminated and said bus has recovered to a normal state of operation, that the same priority is assigned to the same unit to said priority memory means of all said plurality of buses.

5. An information processing system, comprising:

an information processing unit according to any one of claims 1, 2 and 3 and used for the bus controlling method defined in claim 4;

a network to which said information processing unit is connected to; and a plurality of subordinate units connected to said network for exchanging data with said information processing unit.

6. A bus controlling method for an information processing unit in which identical data is transferred by a plurality of buses having a same specification shared by a plurality of units capable of transferring data by using said plurality of buses, each of said plurality of buses including priority memory means for storing information indicating priority of said plurality of units, said method comprising the steps of:

storing information indicating respective bus priority of said plurality of units into said priority memory means so that the same unit includes the same priority in all of the plurality of buses;

assigning a bus grant to a particular one of said plurality of units having the highest priority according to said information stored in said priority memory means;

indicating, to said priority memory means, that said unit to which the bus grant is assigned subsequently has the lowest priority, so that the bus grant is assigned to the same unit for transferring the identical data in said plurality of buses;

assigning, when a fault occurs in a particular one of said plurality of buses, the bus grant to a particular one of said plurality of units having the highest priority according to said information stored in said priority memory means, excluding said bus having the fault occurred therein, so that the bus grant is assigned to the same unit for transferring the identical data in said plurality of buses, while retaining said information indicating priority stored in each of said priority memory means provided with each of said buses other than said bus having the fault occurred therein; and indicating, when the fault having occurred in the particular one of said buses has been eliminated and said bus has recovered to a normal state of operation, that the same priority is assigned to the same unit to said priority memory means of all said plurality of buses.

* * * * *

UNITED STATES PATENT AND TRADEMARK OFFICE
CERTIFICATE OF CORRECTION

PATENT NO. : 5,557,753
DATED : September 17, 1996
INVENTOR(S) : SUENAGA, et al.

It is certified that error appears in the above-indentified patent and that said Letters Patent is hereby corrected as shown below:

On the cover page please change the filing date to --September 10, 1992--.

Signed and Sealed this

Thirtieth Day of September, 1997

Attest:

BRUCE LEHMAN

Attesting Officer

Commissioner of Patents and Trademarks